March 29, 1927.
L. AMATO
VEHICLE BUMPER
Filed Nov. 30, 1926
1,622,754
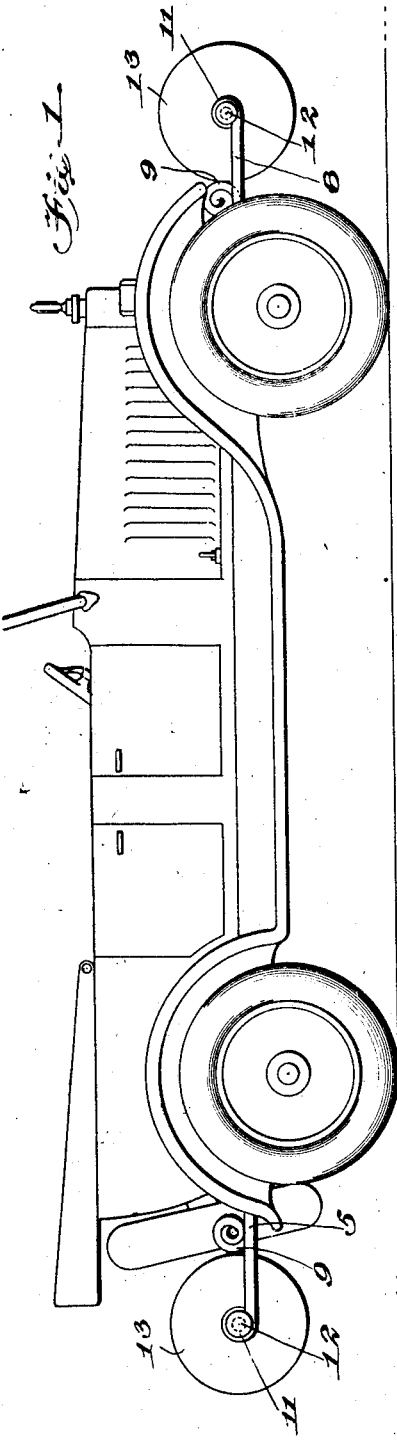
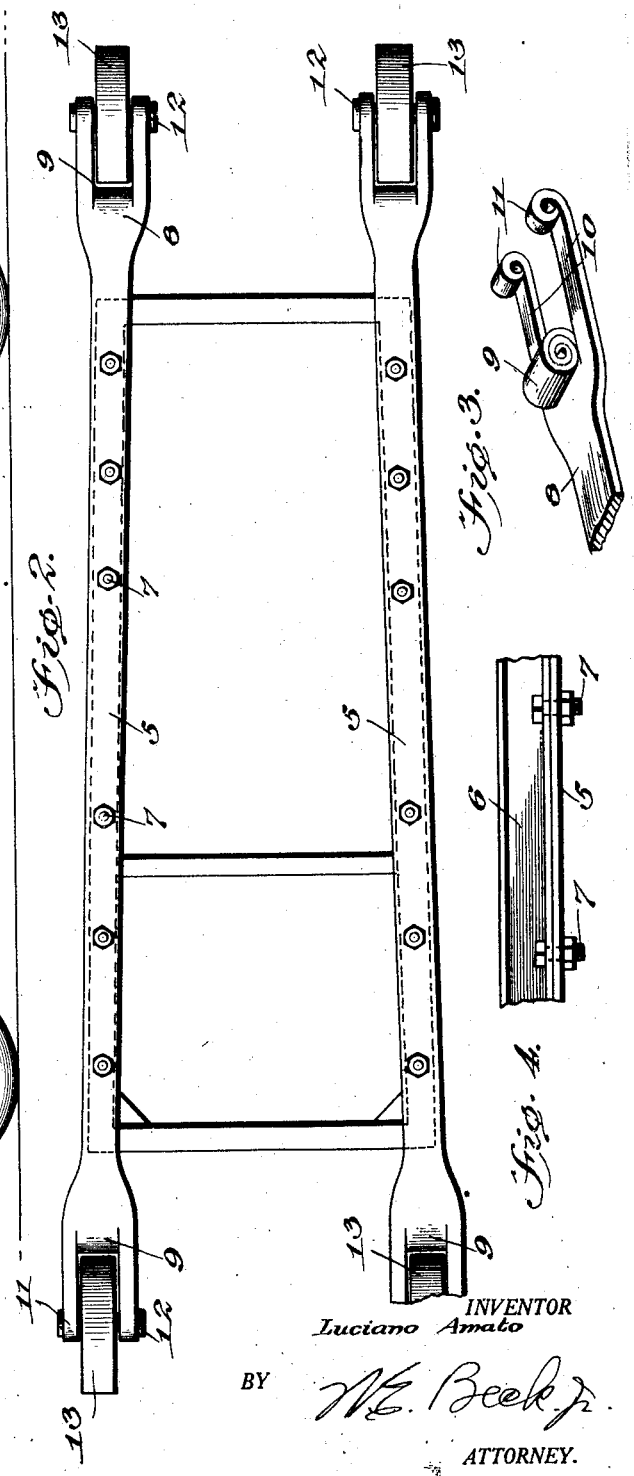
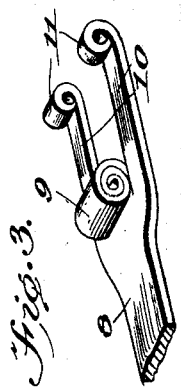
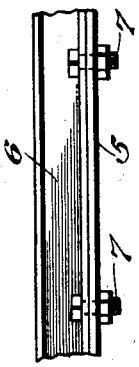
INVENTOR
Luciano Amato
BY
ATTORNEY.

Patented Mar. 29, 1927.

1,622,754

UNITED STATES PATENT OFFICE.

LUCIANO AMATO, OF SOUTH BERKELEY, CALIFORNIA, ASSIGNOR OF ONE-THIRD TO JUSTICE LLOYD SELDEN, OF OAKLAND, CALIFORNIA, AND ONE-THIRD TO JOHN AMATO, OF SOUTH BERKELEY, CALIFORNIA.

VEHICLE BUMPER.

Application filed November 30, 1926. Serial No. 151,740.

My invention relates to vehicle bumpers and has for its object to provide a bumper frame secured beneath the vehicle and extending forwardly and rearwardly at each end thereof and equipped with resilient impact members.

A further object is to provide a device of this character wherein the frame is formed in one piece and arranged to be attached to the under side of the vehicle as a unit.

Another object is to provide a vehicle bumper which is strong and durable in construction, neat in appearance and inexpensive to manufacture.

Other objects and advantages reside in the combination, arrangement and construction of the elements more fully hereinafter described and set forth in the following specifications and claims, reference being had to the accompanying drawing forming part hereof wherein like numerals refer to like parts throughout, and in which—

Figure 1 is a side elevational view of an automobile equipped with my invention, Figure 2 is a bottom plan view of the bumper in its relative position as attached to the chassis of an automobile, Figure 3 is a fragmentary detail perspective view of one of the ends of the bumper with resilient member removed, and Figure 4 is a fragmentary view showing the manner of attaching the bumper to the frame of the car.

Referring now to the drawing wherein for the purpose of illustration I have disclosed a preferred embodiment of my invention I provide a pair of elongated bumper bars 5 each of which is adapted to be attached to the side frames 6 of an automobile chassis and being provided at spaced intervals with openings through which bolts 7 may be inserted for securing the bars to the frame.

The bars are of sufficient length to extend beyond the ends of the chassis both forwardly and rearwardly of the machine and each end of the bar is provided with a flattened head 8. The bumper bars are preferably constructed of sheet metal suitably hardened and tempered to withstand the impacts should the vehicle be in collision with an obstacle. Each head or end of the bumper bar has an intermediate section 9 rolled upon itself inwardly from the end thereby forming a fork-shaped end comprising a pair of spaced apart parallel prongs 10. The end of each prong is turned inwardly upon itself to form bearings 11 within which is rotatably carried an axle 12. A wheel 13 preferably of semi-hard rubber or like material is mounted upon the axle, the wheel being disposed between the forked members 10.

In Figure 1 of the drawing I have illustrated my invention as attached upon a conventional type of automobile and wherein the intermediate portion 9 of the end members and the ends of the forked member are rolled upwardly so as to rest on top of the automobile bar, but it is to be understood that these portions of the device may also be rolled downwardly so as to appear beneath the bumper bar and substantially hidden from view. The rolled intermediate portion of the end of the bumper 9 is in longitudinal alignment with the wheel 13 and serves as a resistance for the wheels when the same collides with an obstacle.

I claim:

1. A device of the character described comprising a bumper bar adapted to be attached to a vehicle and extending forwardly and rearwardly thereof, said bumper bar having its ends fork-shaped and resilient impact members carried at the forked ends thereof.

2. A device of the character described comprising a pair of longitudinally extending bumper bars adapted to be secured to the side frames of a vehicle and extending forwardly and rearwardly at each end thereof, forked heads at each end of the bumper bars and a resilient impact member mounted between the forked ends of said heads.

3. An automobile bumper comprising a pair of longitudinally disposed bumper bars adapted to be secured to the side frames of a vehicle and extending forwardly and rearwardly thereof, heads formed on the ends of said bars, a portion of said head being turned back upon itself to form a forked end for the head, the ends of the forked members being rolled backwardly to form bearings, a shaft mounted in said bearings and a resilient impact member carried on said shaft and disposed between said forked members.

In testimony whereof I affix my signature.

LUCIANO AMATO.